Aug. 17, 1937. J. F. DEGENER, 3D 2,090,253
HANDLE
Filed Jan. 14, 1937
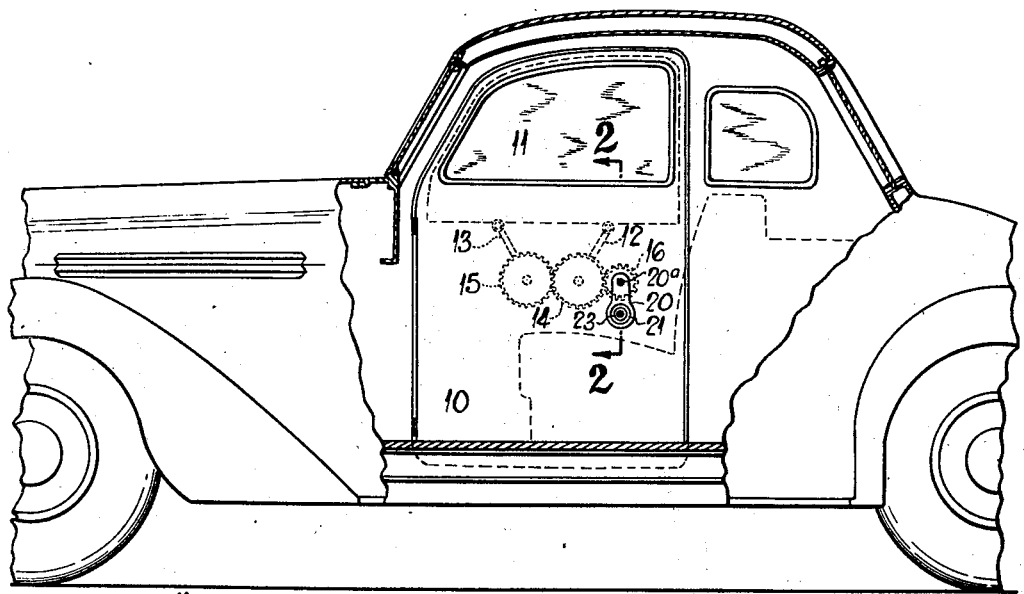
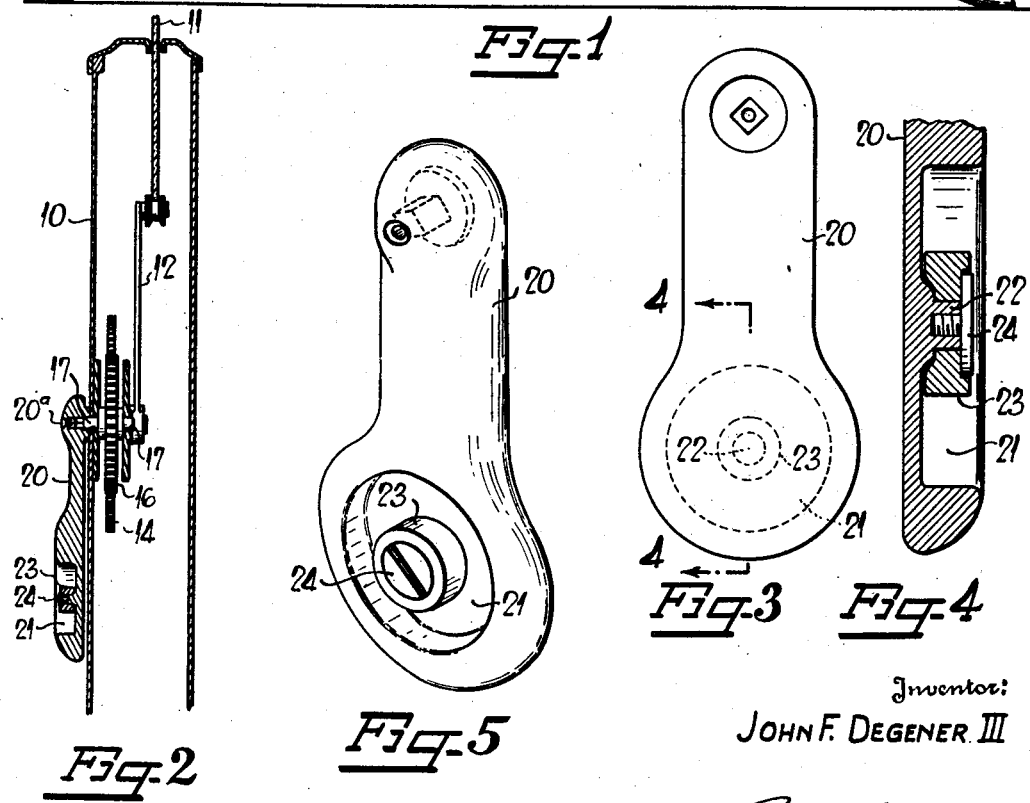
Inventor:
JOHN F. DEGENER III
By James N Eaton
Attorney Patented Aug. 17, 1937

2,090,253

UNITED STATES PATENT OFFICE 2,090,253

HANDLE

John F. Degener, III, Charlotte, N. C.

Application January 14, 1937, Serial No. 120,493

2 Claims. (Cl. 74—545)

This invention relates to an improved handle member for closure operators, especially for closure operating means as employed in doors of an automobile, wherein means are provided for raising and lowering the glass window, said means heretofore, being driven by a handle member disposed on the inside of the door and having a knob thereon.

It is an object of this invention to provide a handle member adapted to be placed on the inside of an automobile door and having one end thereof secured to the window operating mechanism and having in the other end thereof a depression in the center of which is disposed a knob for engagement by the fingers of the occupant of the automobile for turning the handle member for raising or lowering the window.

Heretofore, these handle members have been provided with a knob projecting inwardly from the outer end of the crank or handle. This knob has been objectionable when it becomes engaged with the wearing apparel of the occupant upon entering or leaving the automobile resulting in tearing of the pockets or seriously damaging or rendering unwearable the garment torn in such a manner. Furthermore, in case of an automobile accident in which the driver or the passenger is thrown against one side of the automobile, it very often happens that the protruding knob from the conventional handle secured on the window operating mechanism engages the body of the driver or passengers, resulting in bruises, lacerations and abrasions. By providing a crank or handle member on the window operating mechanism with an enlarged outer end and provided with a cavity in which the knob is placed, the above-complained of imperfections and hazards are eliminated.

Some of the objects of the invention having been stated, other objects will appear as the description proceeds when taken in connection with the accompanying drawing, in which:—

Figure 1 is a side elevation of an automobile showing the central portion thereof broken away to illustrate the invention;

Figure 2 is a vertical sectional view on an enlarged scale taken along the line 2—2 in Figure 1;

Figure 3 is an elevation of the rear side of the handle disposed next to the door;

Figure 4 is an enlarged sectional view taken along line 4—4 in Figure 3;

Figure 5 is an isometric view of the handle removed from the door of the automobile.

Referring more specifically to the drawing, the numeral 10 indicates an automobile door having a window 11 mounted for vertical sliding movement therein, said window having connected thereto one end of arms 12 and 13 which are secured on the shaft of gears 14 and 15. These gears are driven by pinion 16 having a shaft 17 which projects into the interior of the automobile and has heretofore had a conventional crank arm with an outstanding knob secured thereto. In lieu of this conventional crank arm, I provide a suitable crank 20 having suitable means such as screw 20a for securing one end thereof to the squared end of shaft 17. The free end of crank 20 has a circular cavity 21 therein in the center of which is an outwardly projecting portion 22 on which button or knob 23 is rotatably mounted and being confined on portion 22 by means of a screw 24 being threadably embedded in portion 22. The outer surface of knob 23 and screw 24 lie within a plane passing through the outer walls of cavity 21, and therefore, the knob 23 is completely shielded not only against engagement with the pockets of garments of occupants of an automobile upon entering or leaving the same, but also the enlarged free end of the crank having a cavity therein provides room for cavity 21 for reception of knob 23. In case an occupant of an automobile is violently thrown against the handle or crank no injury will result as the portion of the crank surrounding cavity 21 acts as a guard and receives the impact. Therefore, serious injury from the knob to the occupants of the automobile is prevented as in case of the car turning over or other serious accidents.

In the drawing and specification there has been set forth a preferred embodiment of the invention, and although generic terms are employed, they are used in a descriptive sense only, and not for purposes of limitation, the scope of the invention being set forth in the appended claims.

I claim:

1. In an automobile door having a vertically slidable window, means including a spindle for raising and lowering said window, a crank adapted to be disposed on the inside surface of the door and having one of its ends secured to said spindle, the other end of said crank having a cavity therein and a knob disposed in the center of the cavity.

2. In an automobile door having a movable window therein, means including a spindle for moving the window relative to the door, a crank having one end secured to the spindle and having an enlarged portion on its other end provided with a cavity, a knob disposed in said cavity adapted to be engaged by one's fingers for turning the spindle.

JOHN F. DEGENER, III.